US012506266B2

(12) United States Patent
Tang

(10) Patent No.: US 12,506,266 B2
(45) Date of Patent: Dec. 23, 2025

(54) PRINTED DIPOLE ANTENNA

(71) Applicant: PCI Private Limited, Singapore (SG)

(72) Inventor: Wee Hua Tang, Singapore (SG)

(73) Assignee: PCI Private Limited, Singapore (SG)

( * ) Notice: Subject to any disclaimer, the term of this patent is extended or adjusted under 35 U.S.C. 154(b) by 387 days.

(21) Appl. No.: 18/039,698

(22) PCT Filed: Dec. 10, 2020

(86) PCT No.: PCT/SG2020/095001
§ 371 (c)(1),
(2) Date: May 31, 2023

(87) PCT Pub. No.: WO2022/124977
PCT Pub. Date: Jun. 16, 2022

(65) Prior Publication Data
US 2024/0021992 A1 Jan. 18, 2024

(51) Int. Cl.
*H01Q 9/28* (2006.01)
*H01Q 1/48* (2006.01)
*H01Q 5/364* (2015.01)
*H01Q 9/04* (2006.01)

(52) U.S. Cl.
CPC ............. *H01Q 9/0407* (2013.01); *H01Q 1/48* (2013.01); *H01Q 5/364* (2015.01)

(58) Field of Classification Search
CPC ........ H01Q 1/38; H01Q 1/48; H01Q 5/30–40; H01Q 9/0407; H01Q 9/285
See application file for complete search history.

(56) References Cited

U.S. PATENT DOCUMENTS

| | | | | |
|---|---|---|---|---|
| 10,992,045 | B2 * | 4/2021 | Patton | H01Q 9/26 |
| 11,404,786 | B2 * | 8/2022 | Luk | H01Q 7/00 |
| 2003/0080915 | A1 | 5/2003 | Ngin | |
| 2003/0096637 | A1 | 5/2003 | Keller et al. | |
| 2003/0098814 | A1 | 5/2003 | Kelle et al. | |
| 2003/0156065 | A1 | 8/2003 | Jo et al. | |
| 2004/0027286 | A1 | 2/2004 | Poilasne et al. | |
| 2004/0125020 | A1 | 7/2004 | Hendler et al. | |
| 2006/0001575 | A1 | 1/2006 | Jo et al. | |
| 2008/0122715 | A1 | 5/2008 | Puente Baliarda et al. | |
| 2008/0204343 | A1 | 8/2008 | Kildal | |
| 2008/0258991 | A1 | 10/2008 | Montgomery et al. | |
| 2009/0153303 | A1 | 6/2009 | Forster | |

(Continued)

FOREIGN PATENT DOCUMENTS

| | | | |
|---|---|---|---|
| CN | 107768832 | A | 3/2018 |
| EP | 2355245 | A | 8/2011 |

(Continued)

OTHER PUBLICATIONS

International Search Report in International Application No. PCT/SG2020/095001, mailed Jul. 22, 2021; 4 pp.

(Continued)

*Primary Examiner* — Hasan Islam
(74) *Attorney, Agent, or Firm* — Nixon Peabody LLP

(57) ABSTRACT

A printed dipole antenna (10) is provided. The printed dipole antenna (10) includes a plurality of antenna elements (14) and a reference ground (16) on a dielectric substrate (12). Each of the antenna elements (14) is configured to generate resonant modes for a frequency band in a radio-frequency spectrum.

9 Claims, 6 Drawing Sheets

(56) References Cited

U.S. PATENT DOCUMENTS

| | | | |
|---|---|---|---|
| 2010/0283694 | A1 | 11/2010 | Kato |
| 2011/0021139 | A1 | 1/2011 | Montgomery et al. |
| 2012/0268332 | A1 | 10/2012 | Guan et al. |
| 2013/0002501 | A1 | 1/2013 | Li et al. |
| 2013/0176184 | A1 | 7/2013 | Dokai et al. |
| 2015/0257266 | A1 | 9/2015 | Murayama et al. |
| 2017/0162952 | A1 | 6/2017 | Zeng |
| 2020/0154558 | A1 | 5/2020 | Xin et al. |

FOREIGN PATENT DOCUMENTS

| | | | |
|---|---|---|---|
| TW | 553507 | A | 9/2003 |
| WO | 2004066444 | A | 8/2004 |
| WO | 2005050868 | A | 6/2005 |
| WO | 2009030038 | A | 3/2009 |
| WO | 2018039298 | A | 3/2018 |

OTHER PUBLICATIONS

Written Opinion in International Application No. PCT/SG2020/095001, mailed Jul. 22, 2021; 6 pp.

Li Ming, et al: "A Uniplanar Triple-Band Dipole Antenna Using Complementary Capacity Loaded Loop"; IEEE Antennas and Wireless Propogation Letters, vol. 14, 2015; pp. 4.

* cited by examiner

698 MHz Band

698 MHz Band

5900 MHz Band

5900 MHz Band

PRINTED DIPOLE ANTENNA

CROSS-REFERENCE TO RELATED APPLICATIONS

This application is the United States National Stage of International application PCT/SG2020/095001, filed Dec. 10, 2020, the entire disclosure of which is herein incorporated by reference.

FIELD OF THE INVENTION

The present invention relates to the field of telecommunications and more particularly to a printed dipole antenna.

BACKGROUND OF THE INVENTION

As mobile telecommunications standards evolve, time is required to adapt existing infrastructure in multiple areas to accommodate new standards. Rollout rates are therefore non-homogeneous. It would therefore be desirable to provide an antenna system that is compatible with new and existing standards.

SUMMARY OF THE INVENTION

Accordingly, in a first aspect, the present invention provides a printed dipole antenna. The printed dipole antenna includes a plurality of antenna elements and a reference ground on a dielectric substrate. Each of the antenna elements is configured to generate resonant modes for a frequency band in a radio-frequency spectrum.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

The term "about" as used herein refers to both numbers in a range of numerals and is also used to indicate that a value includes the standard deviation of error for the device or method being employed to determine the value. The term "about" as used herein can allow for a degree of variability in a value or range, for example, within 10%, within 5%, or within 1% of a stated value or of a stated limit of a range.

Figure 1:
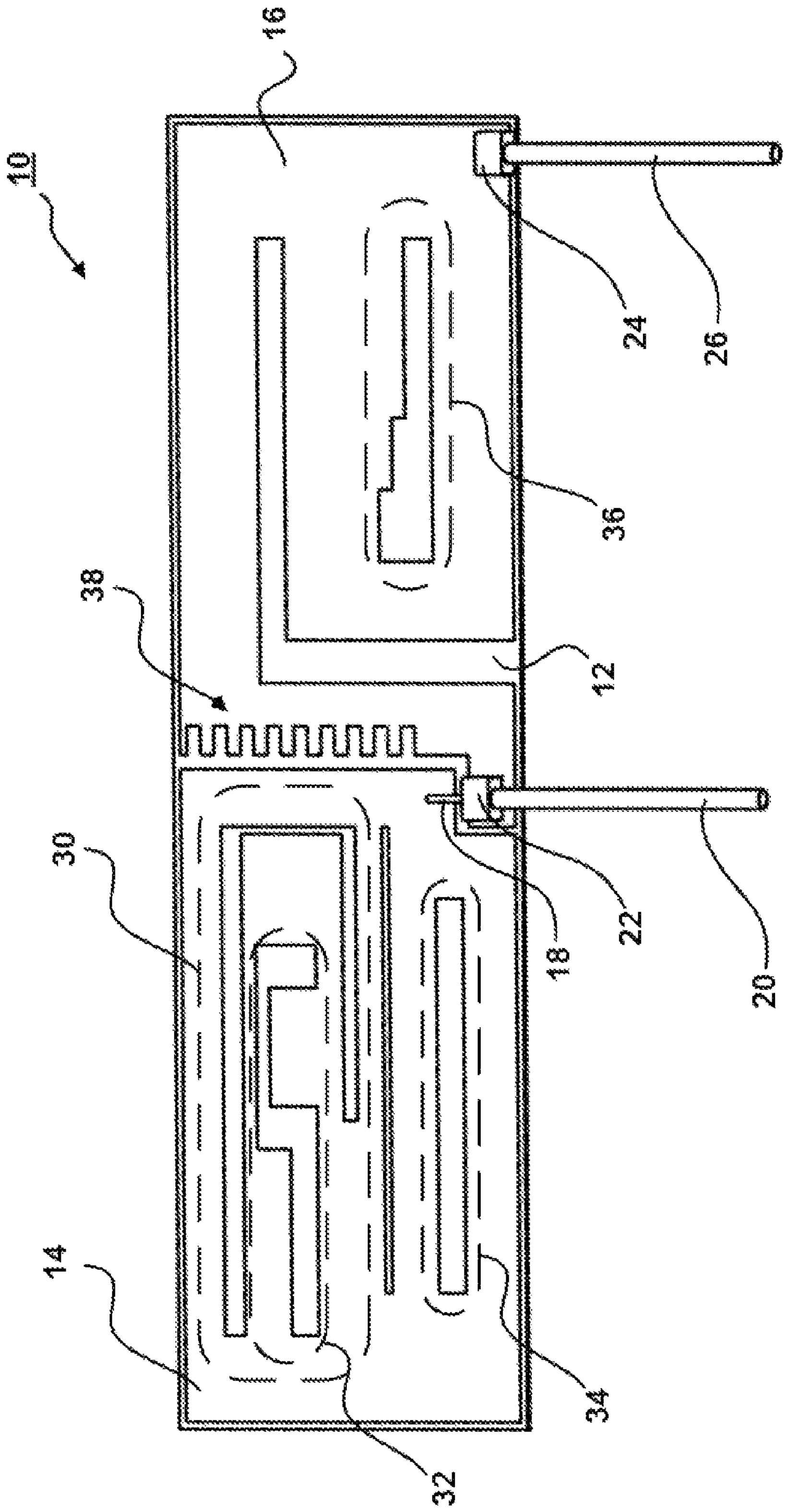
FIG. 1 is a schematic perspective view of a printed dipole antenna in accordance with an embodiment of the present invention.

Referring now to FIG. 1, a printed dipole antenna 10 is shown. The printed dipole antenna 10 includes a dielectric substrate 12. A plurality of antenna elements 14 and a reference ground 16 are provided on the dielectric substrate 12. Each of the antenna elements 14 is configured to generate resonant modes for a frequency band in a radio-frequency spectrum.

The frequency band in the radio-frequency spectrum may be a first frequency spectrum of between about 600 megahertz (MHz) and about 960 MHz, a second frequency spectrum of between about 1,700 MHz and about 2,800 MHz, more particularly, between about 1.71 gigahertz (GHz) and about 2.80 GHz, and a third frequency spectrum of between about 3,500 MHz and about 6,000 MHz.

In the embodiment shown, the printed dipole antenna 10 includes a signal excitation port 18 coupled to the antenna elements 14, the signal excitation port 18 being arranged to receive a first feed cable 20. The signal excitation port 18 attached to the antenna elements 14 provides a signalling conductive pathway to the the printed dipole antenna 10. The printed dipole antenna 10 may further include a first ground port 22 coupled to the reference ground 16, the first ground port being arranged to also receive the first feed cable 20. A second ground port 24 coupled to the reference ground 16 may further be provided, the second ground port 24 being arranged to receive a second feed cable 26.

The printed dipole antenna 10 may have a length L of about 90 millimetres (mm), a width W of about 25 mm and a thickness T of about 0.2 mm. In the present embodiment, the printed dipole antenna 10 comprises two stacks or layers: a first stack or layer being the dielectric substrate 12 for the printed dipole antenna 10 and a second stack or layer being a thin copper layer printing of the antenna elements 14 and the reference ground 16.

Figure 2:
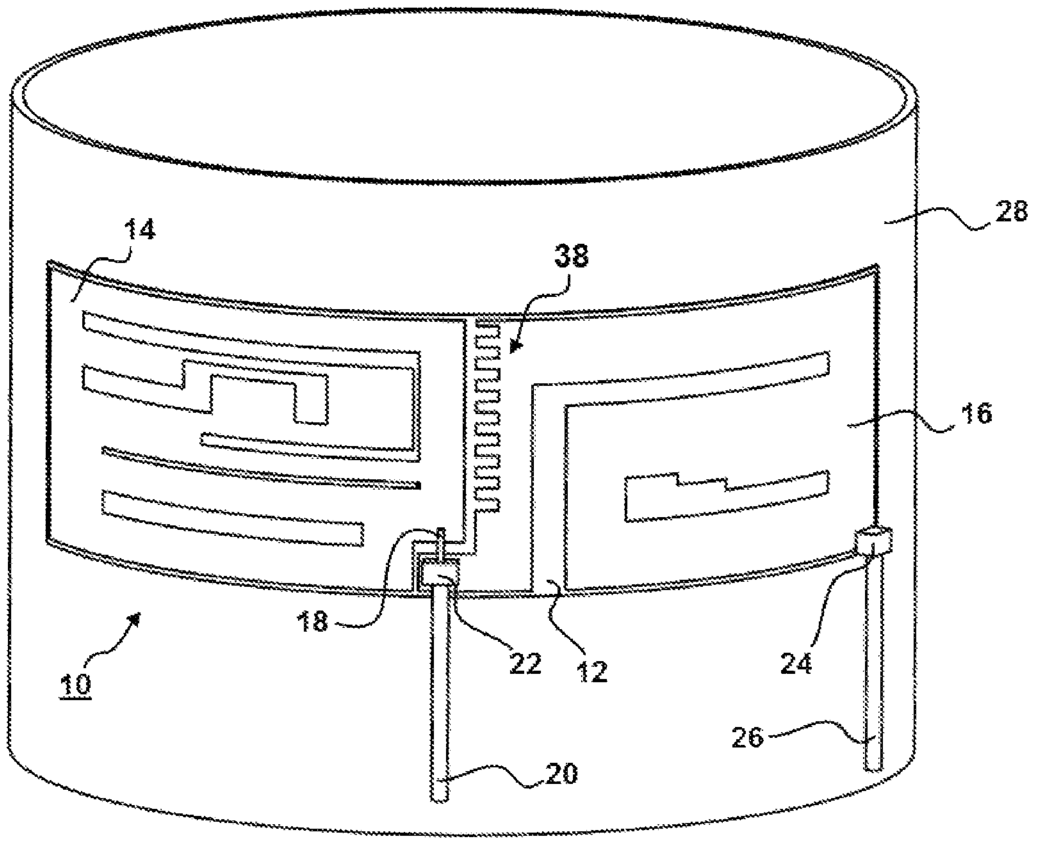
FIG. 2 is a schematic perspective view of the printed dipole antenna of FIG. 1 attached to a cylindrical body.

The dielectric substrate 12 may be made of a polymer film such as, for example, a polyimide film or a pyromellitic dianhydride-oxydianiline (PMDA-ODA) film. In one or more embodiments, the dielectric substrate 12 may be a commercially available polyimide laminate film like DuPont Pyralux® with a thickness of about 0.2 mm and a dielectric constant of about 2.8. Advantageously, the polyimide film is flexible and therefore bendable. This facilitates placement of the printed dipole antenna 10 on various objects due to flexibility of the dielectric substrate 12. An example of this is shown in FIG. 2 with the printed dipole antenna 10 being attached to a cylindrical body 28.

Referring again to FIG. 1, the antenna elements 14 may include a plurality of first decoupling loops 30, 32 and 34, the first decoupling loops 30, 32 and 34 being decoupled from one another in a signal conduction path. The first decoupling loops 30, 32 and 34 form mutual electromagnetic fields coupling to one another to generate multiple resonant modes in a plurality of different frequency spectrums. In the embodiment shown, the first decoupling loops 30, 32 and 34 are combined to define a first antenna pattern on the dielectric substrate 12. Each of the first decoupling loops 30, 32 and 34 may represent or cover a different section of the radio-frequency spectrum. For example, a first of the first decoupling loops 30 may be designed or configured to generate or simulate antenna resonant modes for a low frequency spectrum, namely frequency bands of from about 600 MHz to about 960 MHz, a second of the first decoupling loops 32 may be designed or configured to generate or simulate antenna resonant modes for a middle frequency spectrum, namely frequency bands of from about 1700 MHz to about 2800 MHz or more particularly from about 1.71 GHz to about 2.80 GHz, and a third of the first decoupling loops 34 may be designed or configured to generate or simulate antenna resonant modes for a high frequency spectrum, namely frequency bands of from about 3500 MHz (3.5 GHz) to about 6000 MHz (6 GHz). In this manner, the three (3) internal or first decoupling loops 30, 32 and 34, decoupled from each other in the signalling conductive pathway starting from the excitation port 18, may form comprehensive sets of resonant modes covering the entire frequency spectrum from 600 MHz to 6000 MHz bands, thereby providing wideband antenna capabilities. Although three (3) internal decoupling loops are shown in the present embodiment, it will be appreciated by those of ordinary skill in the art that the present invention is not limited by the number of such decoupling loops. In alternative embodiments, fewer or greater numbers of such decoupling loops may be provided depending on system requirements. The antenna elements 14 act as a source of excitation for the printed dipole antenna 10 and mutually decouple the electromagnetic fields generated by antenna elements 14 to the reference ground 16.

In the present embodiment, the reference ground 16 includes a reference ground plane defining a second antenna pattern on the dielectric substrate 12. In the embodiment, the reference ground plane 16 includes a second decoupling loop 36. The second decoupling loop 36 acts as a reference ground plane for the antenna elements 14 in the first antenna pattern.

In the embodiment shown, the reference ground plane 16 further includes a square-wave-shaped edge 38 adjacent the antenna elements 14. The square-wave-shaped edge or teeth-shaped pattern 38 forms a defective ground pattern which simulates a slow-wave surface current to produce strong magnetic fields coupling to the antenna elements 14. The square-wave-shaped edge 38 also distorts a return path of surface currents to the second decoupling loop 36 in the reference ground plane 16. Advantageously, this increases antenna impedance bandwidth. Although illustrated as being of square-wave-shape in the embodiment shown, the edge 38 adjacent the antenna elements 14 may be a rectangular-wave-shaped edge, a triangular-wave-shaped edge or a combination of the described shapes in alternative embodiments.

Although the first decoupling loops 30, 32 and 34 and the second decoupling loop 36 in the embodiment shown are of rectangular form, it will be appreciated by those of ordinary skill in the art that the present invention is not limited by shape or arrangement of the decoupling loops. In alternative embodiments, the decoupling loops may be of different shapes and may be differently positioned.

The first and second feed cables 20 and 26 feeding the printed dipole antenna 10 may be flexible cables. The first and second ground ports 22 and 24 may be soldered to the reference ground plane 16 with standard soldering joints to mechanically secure and electrically connect the first and second feed cables 20 and 26 to the printed dipole antenna 10.

The first feed cable 20 may be a commonly available coaxial cable having a diameter of either 1.13 mm or 1.37 mm. The coaxial cable 20 may have a length of from about 40 mm to about 120 mm. The length of the coaxial cable 20 may be determined by performing antenna impedance matching when the printed dipole antenna 10 and the coaxial cable 20 are electrically connected to a circuit board, such as a printed circuit board (PCB), during a final product assembly stage at system level.

The second feed cable 26 may be utilized as a current return path or for grounding. The ground cable 26 may be a single core wire connecting to a ground port of either a PCB or system. As an example, the single core wire may be a 17-gauge wire having a core diameter of 1.15 mm according to the American Wire Gauge (AWG) system.

EXAMPLE

The printed dipole antenna 10 was simulated and performance was verified using full-wave electromagnetics Computer Aided Design (CAD) simulation tools, specifically, CST Microwave Studio. The simulation results are shown in FIGS. 3 through 6B described below.

Figure 3:
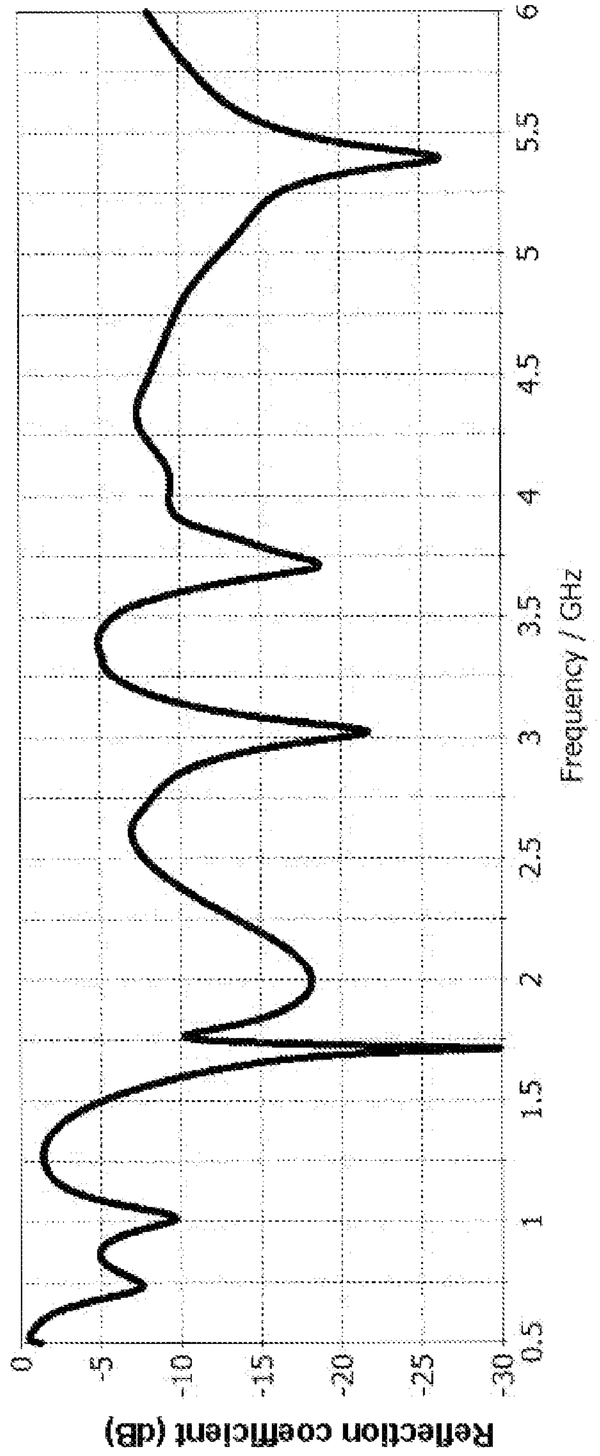
FIG. 3 is a graph of antenna reflection coefficient against frequency.

Referring now to FIG. 3, reflection coefficient or return loss in decibels (dB) of the printed dipole antenna 10 was simulated across a frequency spectrum of from 0.6 GHz to 6 GHz to cover both Long-Term Evolution (LTE) and fifth-generation-New Radio (5G-NR) bands. The simulation results show that typical reflection coefficient ranges of from 6 dB to 15 dB over frequency was achieved, meeting the minimum requirement of 6 dB in an industrial standard.

Figure 4:
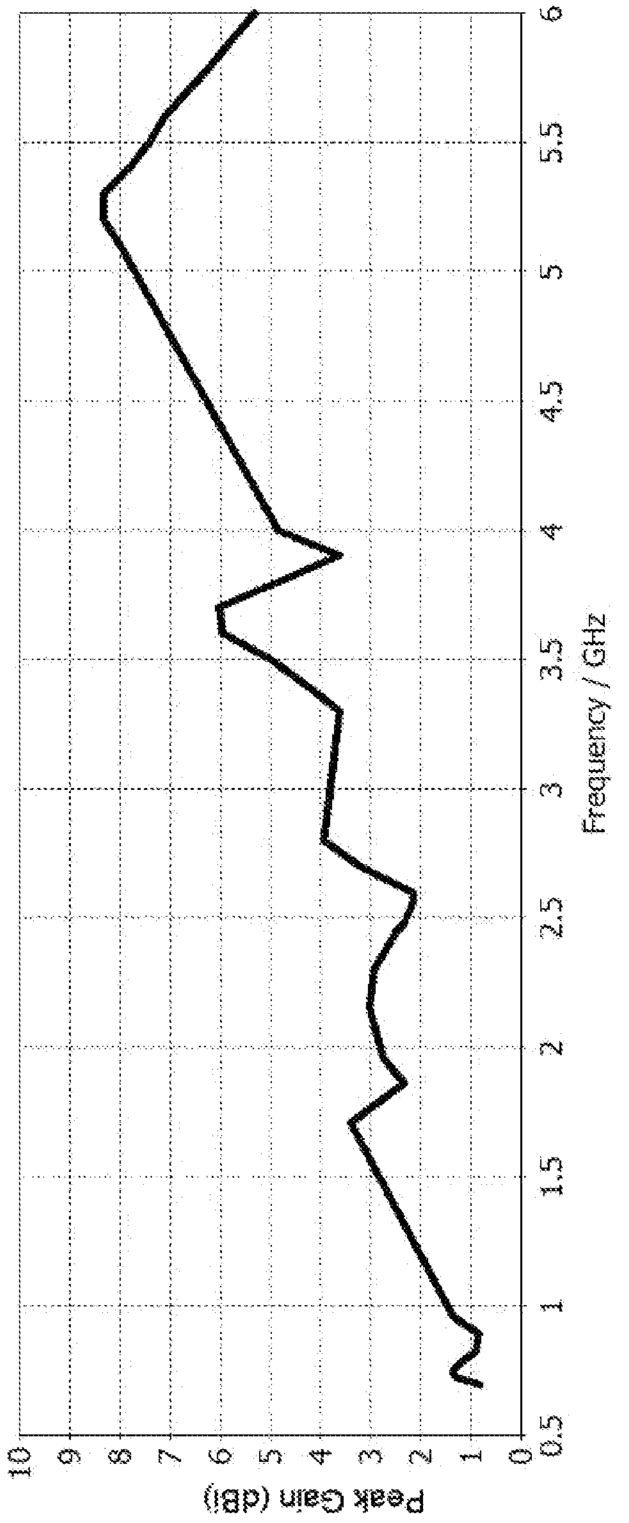
FIG. 4 is a graph of antenna peak gain against frequency.

Referring now to FIG. 4, peak gain of the printed dipole antenna 10 against frequency is shown. As can be seen from FIG. 4, a gain of 0.8 to 4 decibels-isotropic (dBi) was observed across the LTE bands and a gain of 6 dBi was observed across the 5G-NR bands.

Figure 5A:
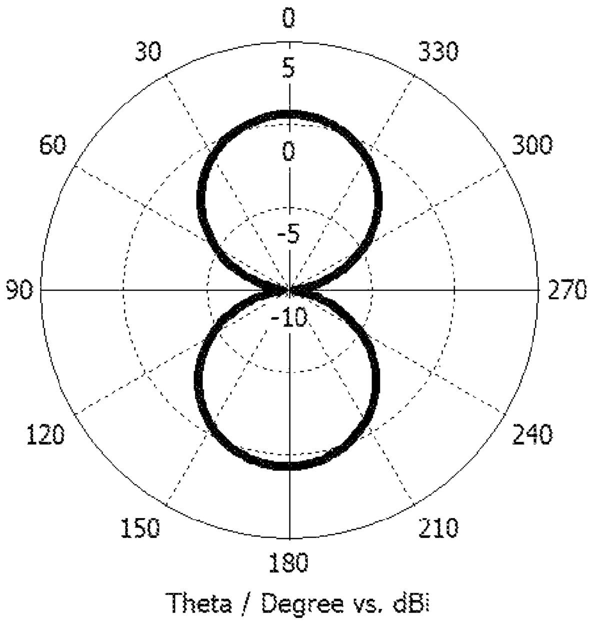
FIGS. 5A and 5B illustrate radiation patterns of a printed dipole antenna at a frequency of 698 megahertz (MHz) in accordance with an embodiment of the present invention.

Referring now to FIG. 5A, a two-dimensional radiation pattern plot in the YZ plane of realized gain against angular theta angles with phi angle fixed at 90 degrees (°) and frequency targeted at 698 MHz overlapping with the printed dipole antenna 10 is shown.

Figure 5B:
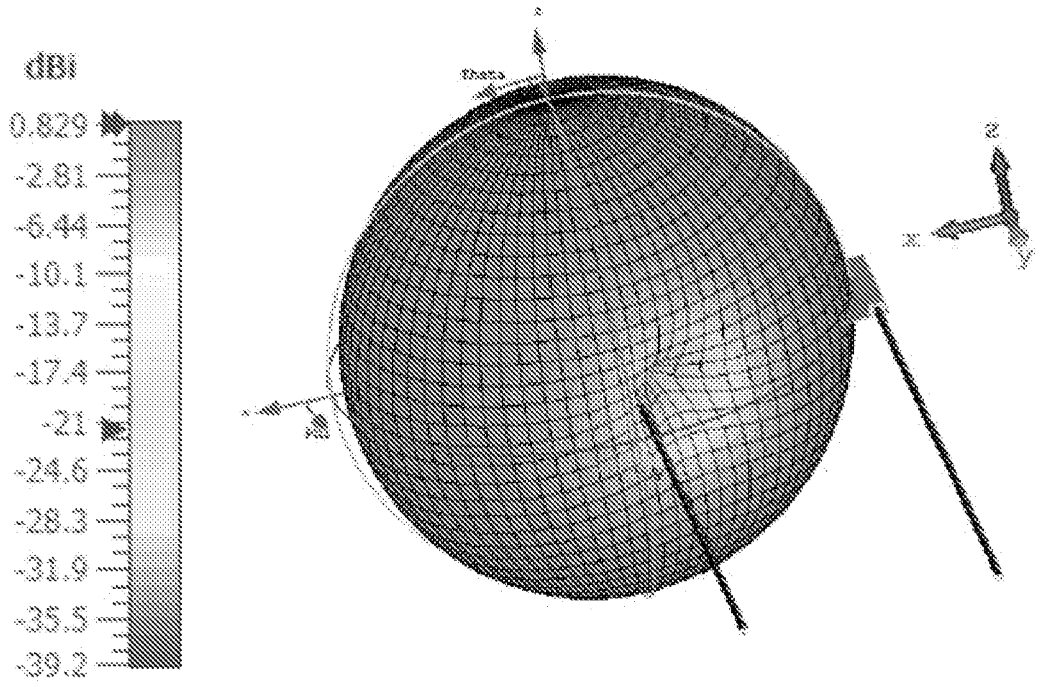

Referring now to FIG. 5B, a three-dimensional radiation pattern plot of realized gain targeted at 698 MHz overlapping with the printed dipole antenna 10 is shown. The donut structure of the radiation pattern shown in FIG. 5B demonstrates that the printed dipole antenna 10 contains the characteristics of a dipole antenna.

Figure 6A:
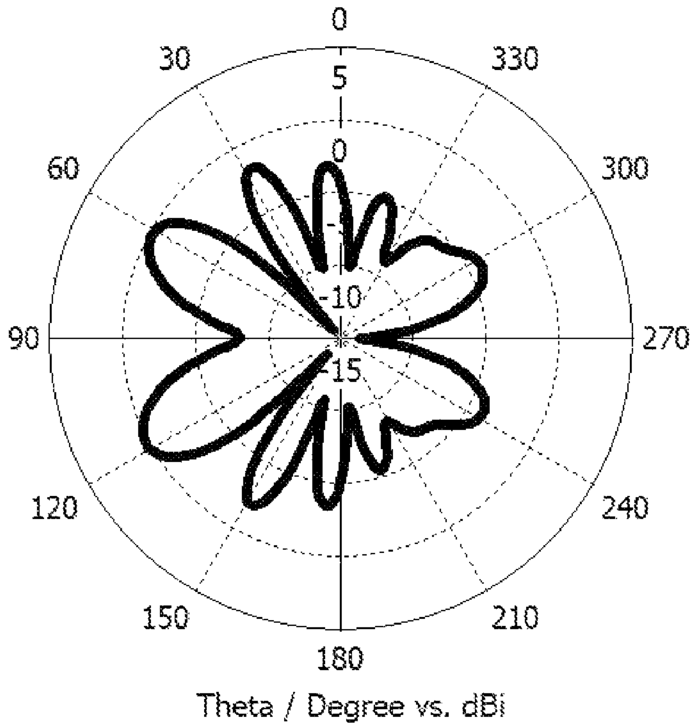
FIGS. 6A and 6B illustrate radiation patterns of a printed dipole antenna at a frequency of 5900 MHz in accordance with another embodiment of the present invention.

Referring now to FIG. 6A, a two-dimensional radiation pattern plot in the YZ plane of realized gain against angular theta angles with phi angle fixed at 90 degrees (°) and frequency targeted at 5900 MHz overlapping with the printed dipole antenna 10 is shown.

Figure 6B:
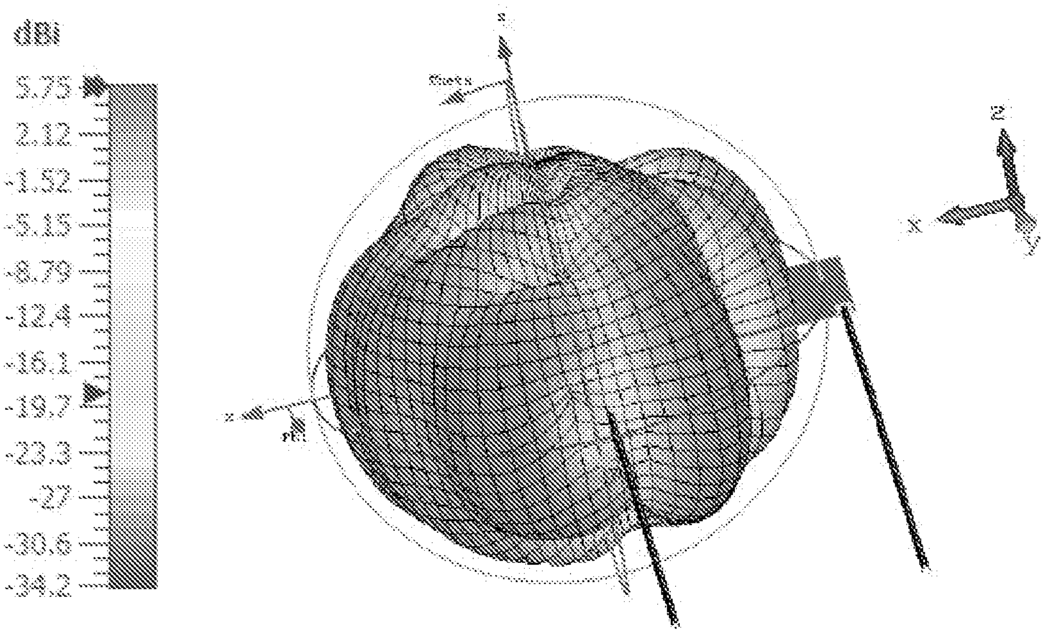

Referring now to FIG. 6B, a three-dimensional radiation pattern plot of realized gain targeted at 5900 MHz overlapping with the printed dipole antenna is shown.

The simulation results show that the wideband printed dipole antenna 10 is able to achieve good performance over wideband across the frequency spectrum of from 600 MHz to 6000 MHz bands and also yield high peak gain ranges from to 6 dBi.

As is evident from the foregoing discussion, the present invention provides a wideband printed dipole antenna with multiband capability and high gain. Advantageously, the wideband antenna of the present invention may serve as a bridging channel between existing and new wireless telecommunications standards. For example, the wideband antenna of the present invention may be compatible with evolving fifth-generation-New Radio (5G-NR) technology and at the same time, serve as a bridging channel for existing Long-Term Evolution (LTE) technology in Artificial Intelligence (AI), machine learning, Internet-of-Things (IoT), Machine-to-Machine (M2M) in wireless communications, medical and real-time transportation monitoring.

While preferred embodiments of the invention have been illustrated and described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A printed dipole antenna, comprising:

a dielectric substrate;

a plurality of antenna elements on the dielectric substrate, wherein each of the antenna elements is configured to generate resonant modes in a different section of a radio-frequency spectrum to provide wideband antenna capabilities, and wherein the different sections of the radio-frequency spectrum comprise a first frequency spectrum of between about 600 megahertz (MHz) and about 960 MHz, a second frequency spectrum of between about 1,700 MHz and about 2,800 MHZ, and a third frequency spectrum of between about 3,500 MHz and about 6,000 MHz;

a reference ground on the dielectric substrate;

a signal excitation port coupled to the antenna elements, wherein the signal excitation port is arranged to receive a first feed cable;

a first ground port coupled to the reference ground, wherein the first ground port is arranged to receive the first feed cable; and a second ground port coupled to the reference ground, wherein the second ground port is arranged to receive a second feed cable to be utilized as a current return or for grounding.

2. The printed dipole antenna of claim 1, wherein the second frequency spectrum is between about 1.71 gigahertz (GHz) and about 2.80 GHz.

3. The printed dipole antenna of claim 1, wherein the antenna elements comprise a plurality of first decoupling loops, the first decoupling loops being decoupled from one another in a signal conduction path.

4. The printed dipole antenna of claim 3, wherein the first decoupling loops are combined to define a first antenna pattern on the dielectric substrate.

5. The printed dipole antenna of claim 1, wherein the reference ground comprises a reference ground plane defining a second antenna pattern on the dielectric substrate.

6. The printed dipole antenna of claim 5, wherein the reference ground plane comprises a second decoupling loop.

7. The printed dipole antenna of claim 6, wherein the reference ground plane further comprises one or more of a square-wave-shaped edge, a rectangular-wave-shaped edge and a triangular-wave-shaped edge adjacent the antenna elements.

8. The printed dipole antenna of claim 1, wherein the dielectric substrate comprises a polymer film.

9. The printed dipole antenna of claim 8, wherein the polymer film comprises one of a polyimide film and a pyromellitic dianhydride-oxydianiline (PMDA-ODA) film.

* * * * *